(12) United States Patent
Leser et al.

(10) Patent No.: US 8,388,985 B2
(45) Date of Patent: *Mar. 5, 2013

(54) EASILY DISPERSIBLE LIPIDIC PHASE

(75) Inventors: Martin Leser, Bretigny (CH); Laurent Sagalowicz, Cully (CH); Martin Michel, Lausanne (CH); Philippe Frossard, Moudon (CH); Corinne Appolonia-Nouzille, Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,288

(22) Filed: Mar. 16, 2012

(65) Prior Publication Data

US 2012/0177708 A1    Jul. 12, 2012

Related U.S. Application Data

(62) Division of application No. 12/094,682, filed as application No. PCT/EP2006/068739 on Nov. 22, 2006, now abandoned.

(30) Foreign Application Priority Data

Nov. 22, 2005    (EP) .................................... 05025405

(51) Int. Cl.
*A61K 9/00* (2006.01)
*A23D 7/00* (2006.01)
*A23D 9/00* (2006.01)

(52) U.S. Cl. ........................................ 424/400; 426/601

(58) Field of Classification Search ............... 424/400; 426/601
See application file for complete search history.

(56) References Cited

U.S. PATENT DOCUMENTS

| | | |
|---|---|---|
| 3,935,033 A | 1/1976 | Bauerlein et al. |
| 4,160,850 A | 7/1979 | Hallstrom et al. |
| 4,200,551 A | 4/1980 | Orthoefer |
| 4,748,028 A | 5/1988 | McKenna et al. |
| 4,835,002 A | 5/1989 | Wolf et al. |
| 5,160,759 A | 11/1992 | Nomura et al. |
| 5,607,622 A | 3/1997 | Ueda et al. |
| 2002/0106390 A1 | 8/2002 | Huglin et al. |
| 2004/0013708 A1 | 1/2004 | Goulson et al. |
| 2004/0022861 A1 | 2/2004 | Williams, III et al. |
| 2007/0213234 A1 | 9/2007 | Yaghmur et al. |

FOREIGN PATENT DOCUMENTS

| | | |
|---|---|---|
| EP | 0 420 315 | 4/1991 |
| EP | 0455288 | 11/1991 |
| EP | 03053149 | 7/2003 |
| EP | 1116515 | 11/2005 |
| EP | 1598060 | 11/2005 |
| JP | 04-099716 | 3/1992 |
| JP | 2004008837 | 1/2004 |

(Continued)

OTHER PUBLICATIONS

J. Bus et al., "Effect of Hydrogen Bonding on Water in Oil Emulsion Properties," Progress in Colloid & Polymer Science (1990), vol. 82, pp. 122-130.

(Continued)

*Primary Examiner* — Daniel Sullivan
*Assistant Examiner* — Trevor Love
(74) *Attorney, Agent, or Firm* — K&L Gates LLP (57) ABSTRACT

The present invention relates to the use of a lipidic phase comprising an oil and a lipophilic additive (LPA), which is suitable to make an oil-in-water emulsion by application of low energy or a manual operation. The lipidic phase contains a Lipophilic Additive (LPA) which forms self-assembly structures inside the emulsion oil droplets. The aqueous phase contains a hydrophilic emulsifier and the lipidic and aqueous phases are mixed without using classical high shearing devices or homogenisers.

12 Claims, 9 Drawing Sheets

FOREIGN PATENT DOCUMENTS

| | | |
|---|---|---|
| JP | 2005-008810 | 1/2005 |
| WO | 9963841 | 12/1999 |
| WO | 0059475 | 10/2000 |
| WO | 02 068111 | 9/2002 |
| WO | 02/078661 | 10/2002 |
| WO | 02076441 | 10/2002 |

OTHER PUBLICATIONS

Sugiura et al., Preparation characteristics of water-in-oil-in-water multiple emulsions using microchannel emulsification (2004), Journal of Colloid and Interface Science, vol. 270, pp. 221-228.

Ponginebbi et al., Effect of relative humidity on lipid oxidation in freeze-dried emulsions (2000), Grasas y Aceites, vol. 51, Fasc. 5, pp. 348-354.

Nakajima et al., Human translation of JP 2004008837, original document published Jan. 2004, JP Patent, 39 pages.

N. Garti et al., "Curretn Opinion in Colloid & Interface Science," (1998), vol. 3, pp. 657-667.

International Search Report for International Application No. PCT/EP2006/068739 mailed May 3, 2007.

Written Opinion for International Application No. PCT/EP2006/068739 mailed May 3, 2007.

EASILY DISPERSIBLE LIPIDIC PHASE

CROSS-REFERENCE TO RELATED APPLICATIONS

This application is a divisional of U.S. patent application Ser. No. 12/094,682, filed May 22, 2008, which is the U.S. national stage designation of International Application No. PCT/EP06/68739 filed Nov. 22, 2006, which claims priority to EP 05025405.1, filed on Nov. 22, 2005, the entire contents of which are expressly incorporated herein by reference.

FIELD OF INVENTION

The invention relates to a lipidic phase comprising an oil and a lipophilic additive (LPA), which is suitable to make an oil-in-water emulsion by application of low energy or a manual operation.

BACKGROUND OF THE INVENTION

Emulsions in Industry

Lipid phases, such as oils or fats are common ingredients used in many different products. In order to give the lipid phase containing products an acceptable physical homogeneity and 'shelf-life' (oil and water do not mix with each other) the bulk lipid phase has to be broken up into small droplets, i.e. the lipid phase has to be dispersed into an aqueous continuous phase. The obtained product is an oil-in-water emulsion. The dispersed oil droplets are stabilised by surface active molecules which form a stabilization layer around the oil droplets. Both oil-in-water and water-in-oil emulsions can be formulated depending on the solubility of the used surface active molecules (also denoted as emulsifiers) which stabilize the dispersed phase droplets. Oil-in-water emulsions are stabilized by hydrophilic surface active molecules, whereas water-in-oil emulsions are stabilized by lipophilic emulsifiers.

In order to make stable and/or homogeneous oil-in-water emulsions, the oil phase has to be dispersed as small oil droplets having a radius from ca 100 nm up to several hundreds of micrometers, into the continuous aqueous phase. For this, homogenisers, i.e. machines which are able to add high energy to the oil-water mixture are necessary to use. The formation of the stabilization layer around the oil droplets during the homogenisation step renders the oil droplets kinetically stable against coalescence, flocculation, coagulation, Ostwald ripening or creaming. The surface active material used in oil-in-water based emulsion products can either be low molecular weight hydrophilic surfactants, such as polysorbates, lysolecithins, etc., or polymers, such as proteins, e.g. gelatin or from milk, soya, or polysaccharides, such as gum arabic or xanthan, or (nano or micro)-particles, such as silica particles, or mixtures thereof.

Oil-in-water emulsion based products are ubiquitous in—Food, Cosmetics, Pharmaceuticals or Agro-chemicals. Prominent oil-in-water emulsion-based food products are for instance milk, mayonnaise, salad dressings, sauces or clinical products. Prominent oil-in-water emulsion-based products used in the cosmetical or pharmaceutical Industry are lotions, creams, milks, pills, tablets, dragees etc. The oil droplets in such products are usually made of lipids, for instance, triglycerides, diglycerides, waxes, fatty acid esters, fatty acids, alcohols, mineral oils, or hydrocarbons.

Use of Emulsions

Emulsions are used either as a starting material, intermediate or final product or as an additive to a final product.

One of the uses of emulsions in Industry is to deliver active compounds or functional molecules, such as, flavours, vitamins, antioxidants, neutraceuticals, phytochemicals, drugs, chemicals, etc. Administration of the active components requires the use of an appropriate vehicle for bringing an effective amount of the active component into the product and/or desired place of action. Oil-in-water emulsions are commonly used delivery systems since they take advantage of the increased solubility of lipophilic active compounds in the oil with respect to water. In EP 1116515, as an example of using emulsions for controlling flavour performance, a hydrophobic active ingredient, such as a flavour component, is mixed into a matrix via an extruder in form of an oil-in-water emulsion in order to increase the stability of the introduced active ingredient during further processing of the product. In WO 00/59475, as an example for a pharmaceutical oil-in-water emulsion, a composition and method for improved delivery of ionizable hydrophobic therapeutic agents is described, which are mixed together with an ionizing agent, a surfactant and a triglyceride to form an oil-in-water emulsion. WO 99/63841, as an example for the use of emulsions in the food area, describes compositions comprising phytosterol having enhanced solubility and dispersibility in an aqueous phase due to the formation of an emulsion or a microemulsion.

Another reason to disperse a lipid into an aqueous phase in form of an emulsion is to create a homogeneous and kinetically stabilized oil and water containing product. This is a need in the manufacture of a great variety of different products: For instance, in ice cream production during the preparation of the ice cream mix before freezing, in the production of mayonnaise, sauces, dressings, creams, lotions, sprays and in lots of more oil containing products in which a lipid phase has to be incorporated into an aqueous continuous phase to obtain a kinetically stable and homogeneous intermediate or end product. One drawback in all these applications is that the oil-water mixture has to be treated with high energy in order to get a sufficient dispersibility of the oil phase, i.e., it is necessary to use specific and sometimes expensive and sophisticated 'high energy input' machines e.g. homogenisers, high shearing mixers, ultrasound, jet mixers etc. to obtain the stable emulsion.

The situation gets critical if no homogeniser or other high energy input machine is available or can be used for the kinetical stabilization of the water-oil mixture. One class of products which suffers from this fact are the Instant or Kitchen products, which usually can be prepared with only manual operation, e.g. shaking or stirring. Instant products are well-known to the consumer. They are well-accepted products since their preparation is easy and does not require the use of sophisticated high energy mixers. Examples are instant soups, spices, pastes, seasonings, butter substitutes, etc. They are based on the principle of adding a concentrated stock composition (paste, powder, liquid) to a product of choice during food preparation at home or in a restaurant. The so prepared products have the disadvantage that they have only a limited storage stability, since the lipid phase is distributed in the product in a inhomogeneous way leading quickly to extensive phase separation after preparation. This sort of instability or inhomogeneity in the prepared product is mainly observed when the Instant products contain oil or other lipidic components. Therefore, the word 'inhomogeneity' describes the fact that the oil phase is not distributed in a homogeneous, i.e., uniform, way throughout the product. This situation can be easily visualized by light microscopy, which allows to localize the oil/fat due to specific oil coloration technology. If the oil inhomogeneity is quite significant, non-dispersed macroscopic oil patches can be observed also by eye.

In general, oil-based ingredients show insufficient dispersion properties when added to water or water based products without applying a high energy process. Manual operation generally is not sufficient to get a stable product, therefore, leading to the formation of very heterogeneous emulsions that quickly phase separate and physically destabilize. The inhomogeneity of the oil containing product is due to the fact that the created emulsion droplets are very large (hundreds of microns) and polydisperse when using low energy mixing.

U.S. Pat. No. 4,160,850 describes a mix suitable for the consumer preparation of a spreadable butter-substitute product. The final product in this case is a water-in-oil emulsion. The mix consists of a mixture of a hard fat, an oil and a water-in-oil emulsifier, which is added to the oil/fat phase to stabilize the water phase which is added by the consumer during in home preparation of the butter-substitute using a conventional home mixer to form a water-in-oil emulsion. These products are quite unstable when stored at room temperature and have to be refrigerated to improve the product stability.

WO 03/053149 A1 discloses a method for the preparation of a spreadable oil and water emulsion comprising mixing a base composition with oil and/or water by a simple manual operation. The base composition comprises a cold hydrating viscosifying agent, such as the cold hydrating starch or a polysaccharide, a hydrophilic emulsifier, such as hydrolysed lecithin, or caseinate or a caseinate replacer, and optionally an acidifying agent. The presence of the viscosifying agent, especially the polysaccharide in the base composition leads to products with smaller average oil droplet size in a final oil-in-water emulsion.

If the oil droplets in the oil-in-water emulsions are ultra small, e.g. in the order of several nanometers to about 200 nm diameter, and spontaneously formed (without the use of a high energy intake device) the emulsion is called an 'oil-in-water microemulsion' (Evans, D. F.; Wennerström, H. (Eds.); 'The Colloidal Domain', Wiley-VCH, New York, (1999)). These emulsions are clear and thermodynamically stable and, therefore, are for the man skilled in the art different from ordinary emulsions the latter being thermodynamically unstable and generally turbid.

JP 2004 008837 discloses an oil in water emulsion which contains water-soluble solid particles present in the oil droplets. The particles are in the size range of 20 nm to 10 µm. The particles are prepared in a water-in-oil (w/o) emulsion by means of dehydration (i.e., not a spontaneous process) before the whole particle/oil (S/O) suspension is dispersed in an aqueous phase using the porous membrane emulsification process.

WO 02/076441 discloses the use of an alcohol-in-fluorcarbon microemulsion as a precursor for the preparation of solid nanoparticles. The nanoparticles have a diameter below 200-300 nanometers. Nanoparticle formation is not spontaneous and triggered by cooling the precursor microemulsion below about 35° C., or by evaporating the alcohol in the precursor microemulsion or by diluting the microemulsion with a suitable polar solvent.

US 2004/022861 discloses a w/o/w double emulsion, in which the oil droplets containing an aqueous microscopic water phase containing protein or another hydrophilic agent. The whole double emulsion is sprayed into, for instance, liquid nitrogen via a capillary nozzle for production of protein-loaded microparticles.

All these examples describe the non-spontaneous formation of solid hydrophilic (nano)particles using w/o microemulsions or w/o or w/o/w double emulsions and needing an external trigger for the solidification of the hydrophilic domains inside the oil droplets. After preparation of the (nano)particles they are largely unaffected by environmental factors such as temperature, pH, or external fluid properties. It has to be mentioned that ordinary w/o microemulsions in which the water droplets are not solidified, i.e. fluid, are largely affected by such environmental factors.

It is the objective of the invention to provide a new solution which allows to disperse a lipidic phase into an aqueous phase to form an oil-in-water emulsion without using a high energy intake mixing machine, but only a manual operation, such as hand shaking or hand stirring with a spoon or an equivalent low energy device which is used in the kitchen, restaurants or in Food Service devices. A low energy device can be also selected from methods allowing to form oil droplets using membrane emulsification, nano- and microfluidics devices or static mixers. The lipidic phase used for making the emulsion of this invention is easy to prepare and does not need sophisticated mixing equipment.

DESCRIPTION OF THE INVENTION

The present invention is based on the finding of novel nano-sized self-assembled structures in the interior of ordinary oil droplets when the oil phase contains a lipophilic additive (LPA). The structures inside the droplets are thermodynamically stable and stabilized by the lipophilic additive (LPA). So, for the purpose of this invention, a lipidic phase which consists of an oil or fat and a lipidic additive, is defined from which an oil-in-water emulsion, comprising oil droplets having a nano-sized self-assembled internal structures, is made. The presence of the nano-sized self-assembled structures inside the oil phase is responsible for the significant reduction of the interfacial tension established between the aqueous and the lipidic phase measured with a common drop shape analysis tensiometer. Typically the measured interfacial tension between the aqueous phase (containing no additional emulsifier) or normal tap water and the lipidic phase of this invention (oil, such as a triglyceride, plus the LEA, such as unsaturated monoglycerides (DIMODAN U/J), is between 1-5 mN/m when measured after an adsorption time which is not longer than 10 to 100 seconds. The respective interfacial tension between water and oil in the absence of an added LPA in a triglyceride oil phase has been measured to be between 6 and 30 mN/m at room temperature, depending on the degree of purity of the used oil and the salt content in the aqueous phase (no emulsifier or surfactant added). If the water (containing no extra emulsifier)-oil interfacial tension is lower than ca. 5 mN/m after an adsorption time of less than 100 seconds (this time is called also the 'life time' of the oil droplet immersed in the water phase), the break-up of the oil into small and homogeneous droplets is significantly facilitated without using a high energy intake device. Under such conditions, it is possible to form emulsions which contain small and homogeneously distributed oil droplets throughout the product. In order to make the created oil droplets also stable against coalescence after they were formed, a hydrophilic emulsifier is added to the system. In this way stable and homogeneous emulsions can be produced just using low energy or performing a manual operation. High shear homogenisers are superfluous in this case. This means, that homogeneous and stable oil-in-water emulsions can be prepared when a lipophilic additive, such as the monoglyceride, is added to the oil phase prior to the mixing in concentrations above 2-3 wt % on the total lipid phase using only low energy procedures, such as manual operations, hand shaking or stirring with a spoon, or similar low energy operation processes. This lower lipophilic additive concentration limit, however, depends on the chemical structure of both the LPA and oil an can be as low as 0.1% LPA on the oil phase.

The characteristic low interfacial tension measured between the lipidic phase of the present invention and an aqueous phase can only be quantified in the absence of extra hydrophilic amphiphilic molecules, surfactants or emulsifiers in the water phase. In this case it can easily be measured and monitored by means of standard tensiometers, such as a Pendant prop tensiometer (example the TRACKER tensiometer from Teclis-ITConcept from France, of the PAT tensiometer from SINTERFACE Technologies from Berlin, Germany) or a drop volume tensiometer (example the TVT 2 from Lauda, Germany). The measurements are done in the absence of any additional hydrophilic emulsifier, since adding an additional hydrophilic emulsifier into the aqueous phase, would disturb the measurements. The extra emulsifier would also adsorb to the interface and decrease the measured interfacial tension. Of course, when making the emulsion of the invention, the hydrophilic emulsifier is needed in order to make the produced emulsion droplets stable against coalescence.

The homogeneity of the obtained emulsions of this invention is also reflected in the relatively low measured mean oil droplet size. For instance, preparing an emulsion of this invention containing 40% soybean oil and 1-10% DIMODAN U/J (the LPA) calculated on the total lipidic phase, and 60% of an aqueous 5 wt-% Na caseinate solution by using a propeller mixer produced oil droplets which are 2-4 times smaller than the emulsion droplets which do not contain DIMODAN U/J, respectively.

In an alternative embodiment of this invention the oil-in-water emulsion is made by using a 2-chamber assembly. This 2-chamber assembly allows to store separately the lipidic and aqueous phase of the invention before mixing. The assembly contains at its exit means which allow to mix the lipidic and hydrophilic phase to produce the oil-in-water emulsion of the invention. The low energy mixing device can be a static mixer which is fixed at the end of the assembly. When pressing the lipidic and aqueous phases downwards the phases pass through the low energy mixing device and the emulsion is formed. Experiments have shown that using an oil phase, such as triglycerides, which contains no LPA or a LPA concentration which is lower than 0.25 wt-% (calculated on the total lipidic phase), no stable and homogeneous emulsion can be prepared with the 2-chamber device.

In still another embodiment of this invention the oil-in-water emulsion is made by pressing a pre-emulsion of the lipophilic and aqueous phase through a static mixer in order to produce the homogeneous and stable oil-in-water emulsion of this invention. The homogeneous emulsion of this invention can also be formed by simply shaking or compressing a pouch which contains the lipidic phase of this invention and an aqueous phase. Such emulsion products are used, for instance, in clinical or enteral nutrition for tube feeding applications, where the mechanical forces for mixing the instable oil-water mixture are usually very low.

In still another embodiment of this invention, the oil-in-water emulsion is made by dissolving the respective emulsion in form of a powder into cold water. In this case the oil, containing the lipophilic additive, is easily dispersed and powder material easily reconstituted by, for instance, stirring with a spoon at room temperature or temperatures below 25° C. leading to a homogeneous, and stable oil-in-water emulsion.

In still another embodiment of this invention, the formed oil droplets exhibit a nano-sized self-assembled structure in their interior. This internal oil droplet structure is formed by the presence of the lipophilic additive (LPA) and mainly consists of nano-sized and thermodynamically stable hydrophilic domains, i.e., water droplets, rods or channels. The nano-sized domains, which are formed spontaneously (thermodynamically driven) inside the emulsion oil droplets, are stabilized by the LPA. The lipophilic additive (LPA) has a slight amphiphilic character, i.e., it contains a hydrophilic head group and a lipohilic chain. The hydrophilic part of the LPA molecule is part of the hydrophilic domain structure. The hydrophilic domains can be of the size of 0.5 to 200 nm of diameter, preferably in the range of 0.5 to 150 nm of diameter, even more preferably in the range of 0.5 to 100 nm of diameter, and most preferably in the range of 0.5 to 50 nm. The size of the hydrophilic domains critically depends on the amount of LPA added to the oil droplets and on the type (chemical structure) of the used oil. The spontaneous formation of the nano-sized self-assembled structure inside the oil droplets is independent on the energy intake, used to make the emulsion.

As used herein, the 'hydrophilic domain' consists of the water domains and the hydrophilic headgroup area of the LPA molecules. Due to their ultra-small size, they also exhibit a large surface area which is a suitable location for the solubilization of a variety of different compounds.

The emulsions related to this invention are clearly distinguished from emulsions commonly known as water-oil-water double emulsions. w/o/w (water/oil/water) double emulsions are oil-in-water emulsions, in which the oil droplets contain micron-sized water droplets (Garti, N.; Bisperink, C.; Curr. Opinion in Colloid & Interface Science (1998), 3, 657-667). The water droplets inside the dispersed double emulsion oil droplets are prepared (dispersed) by mechanical energy input, e.g., homogenisation, and, as a consequence, are thermodynamically unstable and not self-assembled. The diameter of the inner water droplets in a w/o/w double emulsion are larger than 300 nm diameter. The emulsions of this invention can easily be distinguished from ordinary w/o/w double emulsions since the formation of the nano-sized self-assembled structure inside the oil droplets of the emulsion of this invention is spontaneous and thermodynamically driven, and the mean diameter of the water droplets or channels is below 200 nm.

Thus the invention is directed towards oil droplets which contain a nano-sized self-assembled structure with hydrophilic domains. The oil droplets are formed by applying low energy or a manual operation. The notion 'self-assembly' or 'self-organization' refers to the spontaneous formation of aggregates (associates) or nano-structures by separate molecules. Molecules in self-assembled structures find their appropriate location based solely on their structural and chemical properties due to given intermolecular forces, such as hydrophobic, hydration or electrostatic forces (Evans, D. F.; Wennerström, H. (Eds.); 'The Colloidal Domain', Wiley-VCH, New York, (1999)). The result of self-assembly does not depend on the process itself and corresponds to a state of minimum energy (stable equilibrium) of the system.

Emulsion Formulation

The present invention concerns the use of a lipidic phase comprising an oil and a lipophilic additive (LPA) for preparing an oil-in-water emulsion wherein the LPA content in the lipidic phase is comprised between 0.25-wt-% and 84 wt-%. Preferably the LPA content is comprised between 2.5 wt-% and 80 wt-%. Even more preferably said LPA content is comprised between 5 wt-% and 80 wt-%. Even most preferably the LPA content is between 10 wt-% and 80 wt-%, and wherein the aqueous phase contains a hydrophilic emulsifier and wherein both phases are mixed. The interfacial tension between the lipidic phase of the invention and an aqueous phase which contains no hydrophilic emulsifiers, is below 5 mN/m when measured up to 100 seconds or shorter.

Furthermore, the present invention concerns the use of a lipidic phase wherein the mixing of lipidic and aqueous phases is made by using a manual operation or a low energy device.

Another object of the invention is to provide an assembly, comprising a pre-mix of the lipidic phase of the invention and an aqueous phase containing a hydrophilic emulsifier in a container and comprising further means for preparing the oil-in-water emulsion of the invention.

Another object is to provide an assembly, comprising a lipidic phase which is separated from an aqueous phase containing a hydrophilic emulsifier in a container, with an exit comprising means for mixing both phases and preparing the oil-in-water emulsion of the invention.

Another object is to provide an assembly comprising a lipidic and an aqueous phase containing a hydrophilic emulsifier, where both phases are in a flexible pouch.

Another object is to provide an oil-in-water emulsion comprising a lipidic and an aqueous phase containing a hydrophilic emulsifier, wherein the means are selected from the group consisting of manual squeezing, magnetic stirring, hand shaking, spoon or whisk stirring, vortex mixing, membrane emulsification, static mixer, kitchen mixer, nano- and microfluidics devices, pouch mixing or any mixer which creates a turbulent flow, or combinations thereof.

The present invention concerns also a lipidic phase which after low energy mixing with an aqueous phase gives an oil-in-water emulsion, wherein the oil droplets exhibit a nano-sized structurisation with hydrophilic domains being formed by a lipophilic additive (LPA). The LPA can be added as such or made in situ by chemical, biochemical, enzymatic or biological means.

The amount of oil droplets (oil droplet volume fraction) present in the emulsion of this invention is the amount generally used in ordinary oil-in-water emulsion products. The volume fraction of the lipidic phase can vary from a fraction of a percent (<0.001% on the total product), as is used in therapeutic oil-in-water emulsions, in which the lipidic phase is an expensive drug, nutrient, chemical or another functional lipophilic component, up to 80% (on the total product), as observed in HIPE's (High Internal Phase Emulsions), such as, for instance, full-fat mayonnaise.

More precisely, the present invention is directed to a lipidic phase and its corresponding oil-in-water emulsion comprising dispersed oil droplets having a nano-sized self-assembled structured interior comprising
(i) an oil selected from the group consisting of mineral oils, hydrocarbons, vegetable oils, fats, waxes, alcohols, fatty acids, mono-, di- or tri-acylglycerols, essential oils, flavouring oils, lipophilic vitamins, esters, neutraceuticals, terpins, terpenes and mixtures thereof,
(ii) a lipophilic additive (LPA) or mixtures of lipophilic and hydrophilic additives, having a resulting HLB value (Hydrophilic-Lipophilic Balance) lower than about 10, preferably lower than 8.
(iii) hydrophilic domains in form of droplets, rods or channels comprising of water or a non-aqueous polar liquid, such as a polyol, and
an aqueous continuous phase, which contains emulsion stabilizers or emulsifiers.

As used herein, a 'lipidic phase' refers to an oil phase containing a certain amount of a 'lipophilic additive'. The oil phase can be also partially crystallized fat, such as hardened palm oil, hardended palm, kernel oil, butter fat at the temperature of use. The temperature of emulsion formation can be between 4° C. and 100° C.

As used herein, a 'lipophilic additive' (abbreviated also as 'LPA') refers to a lipophilic amphiphilic agent which spontaneously forms stable nano-sized self-assembled structures in the bulk and dispersed oil phase. In order to form self-assembly structures in the oil phase, the LPA concentration in the oil phase must be larger than the CMC (critical micellar concentration). Below this concentration, no self-assembly structures are formed. For instance, the CMC of unsaturated monoglycerides in triglyceride oils is around 2 wt % and 0.1 wt % in squalene or kerosene. (J. Bus et al. Progr Colloids Polymer Sci (1990) 82, 122-130). As shown in this publication, the CMC critically depends on the molecular structure of the oil and emulsifier, i.e. LPA.

The lipophilic additive (mixture) is selected from the group consisting of fatty acids, sorbitan esters, propylene glycol mono- or diesters, pegylated fatty acids, monoglycerides, derivatives of monoglycerides, diglycerides, pegylated vegetable oils, polyoxyethylene sorbitan esters, phospholipids, cephalins, lipids, sugar esters, sugar ethers, sucrose esters, polyglycerol esters and mixtures thereof.

According to the first embodiment of the invention the oil-in-water emulsion exhibits oil droplets having an internal structure taken from the group consisting of the $L_2$ structure or a combination of a L2 and oil structure (microemulsion or isotropic liquid droplets) in the temperature range of 0° C. to 100° C.

According to the second embodiment of the invention, the oil-in-water emulsion exhibits oil droplets having a L2 structure (microemulsion or isotropic liquid droplets) in the temperature range of 0° C. to 100° C.

According to a third embodiment of the invention, the oil-in-water emulsion exhibits oil droplets having an internal structure taken from the group consisting of the L2 structure (microemulsion or isotropic liquid droplets) or reversed micellar cubic structure or reversed bicontinuous L3, and a combination thereof in the temperature range of 0° C. to 100° C.

According to a fourth embodiment of the invention, the oil-in-water emulsion exhibits oil droplets having an internal reversed micellar cubic structure in the temperature range of 0° C. to 100° C.

According to a fifth embodiment of the invention, the oil-in-water emulsion exhibits oil droplets having an internal reversed hexagonal structure in the temperature range of 0° C. to 100° C.

According to a sixth embodiment of the invention, the oil-in-water emulsion exhibits oil droplets having an internal structure which is a combination of the previously described structures in the temperature range of 0° C. to 100° C.

All above mentioned internal structures can be without doubt determined by SAXS analysis and by cryo-TEM (Qiu et al. Biomaterials (2000) 21, 223-234, Seddon. Biochimica et Biophysica Acta (1990) 1031, 1-69, Delacroix et al. J. Mol. Biol. (1996) 258, 88-103, Gustafsson et al. Langmuir (1997) 13, 6964-6971, Portes. J. Phys: Condens Matter (1992) 4, 8649-8670) and fast Fourier Transform (FFT) of cryo-TEM images.

For certain applications, the use of temperatures higher than 100° C. (for example retorting temperature) is also possible and is covered by the present invention.

The lipophilic additive (LPA) can also be mixed with a hydrophilic additive (having a HLB larger than 10) up to the amount that the mixture is not exceeding the overall HLB of the mixture of 10 or preferably 8. The additive (mixture) can also be made in-situ by chemical, biochemical, enzymatic or biological means.

The amount of added lipophilic additive is defined as $\alpha$. $\alpha$ is defined as the ratio LPA/(LPA+oil)×100. $\alpha$ is preferably higher than 0.25, more preferably higher than 0.5, even more preferably higher than 1 and even more preferable higher than 2. The ratio $\alpha$=LPA/(LPA+oil)*100 is preferably lower than 84, more preferably lower than 70. Any combination of the lower and upper range is comprised in the scope of the present invention. $\alpha$ can be given either in wt-% or mol-%. The lower and higher limit of $\alpha$ depends on the properties of the taken oil and LPA, such as the polarity, the molecular weight, dielectric constant, etc., or physical characteristics such as the critical aggregation concentration or critical micellar concentration (CMC) of the LPA in the oil droplet phase. The lower $\alpha$ limit is generally comparable to or higher than the measured CMC exerted by the used LPA/oil mixture. 'Comparable to' means here that $\alpha$ is >0.2×CMC.

The emulsion is stabilized by a hydrophilic emulsifier suitable to stabilize ordinary oil-in-water emulsion droplets. The emulsion can be aggregated (flocculated) or not depending on the used emulsifier. The hydrophilic emulsifier is selected from the group consisting of low molecular weight surfactants having a HLB>8, gelatin, proteins from e.g. milk or soya, peptides, protein hydrolisates, block co-polymers, surface active hydrocolloids such as gum arabic, xanthan gum, diblockcopolymer- or apoprotein-like biopolymers, such as protein-polysaccharide conjugates or coacervates, or protein-polysaccharide, protein-protein, or polysaccharide-polysaccharide hybrids, conjugates or coacervates or mixtures of polymers and biopolymers, or protein nanoparticles, surfactant-protein nanoparticles or other nano- or micro-particles suitable to stabilize oil-in-water emulsions.

The hydrophilic emulsifier can also be mixed with the LPA, or with the oil, or with the LPA and the oil. This means, that the hydrophilic emulsifier can partly also be present in the interior of the oil droplet and affecting the internal nano-sized self-assembled structure and the mixing behaviour during the preparation of the emulsion.

The ratio $\beta$=hydrophilic emulsifier/(LPA+oil+emulsifier)×100 describes the amount of emulsifier used to stabilize the oil droplets with respect to the oil plus LPA content. $\beta$ is preferably higher than 0.1, more preferably higher than 0.5, more preferably higher than 1, and more preferably higher than 2, and even more preferably higher than 5.

The ratio $\beta$=emulsifier/(LPA+oil+emulsifier)×100 is preferably lower than 90, more preferably lower than 75 and even more preferably lower than 50. Any combination of the lower and upper range is comprised in the scope of the present invention. $\beta$ can be given either in wt-% or mol-%. The lower and higher limit of $\beta$ depends on the properties of the taken emulsifier, oil and LPA.

Various active components can be solubilized in the nano-sized self-assembled structured interior of the oil droplets. They can be oil-soluble, oil non-soluble, crystallinic or water soluble components selected from the group consisting of nutraceuticals, such as lutein, lutein esters, β-carotene, tocopherol, tocopherol acetate, tocotrienol, lycopene, Co-$Q_{10}$, flax seed oil, lipoic acid, vitamin $B_{12}$, vitamin D, α- and γ-polyunsaturated fatty acids, phytosterols, flavonoids, vitamin A, vitamin C or its derivatives, sugars, food supplements, functional ingredients, food additives, plant extracts, medicaments, drugs, pharmacologically active components, cosmetically active components, peptides, proteins or carbohydrates, aroma, salts and flavours.

In the oil-in-water emulsion according to the invention, the lipophilic additive is selected from the group consisting of myristic acid, oleic acid, lauric acid, stearic acid, palmitic acid, PEG 1-4 stearate, PEG 2-4 oleate, PEG-4 dilaurate, PEG-4 dioleate, PEG-4 distearate, PEG-6 dioleate, PEG-6 distearate, PEG-8-dioleate, PEG-3-16 castor oil, PEG 5-10 hydrogenated castor oil, PEG 6-20 corn oil, PEG 6-20 almond oil, PEG-6 olive oil, PEG-6 peanut oil, PEG-6 palm kernel oil, PEG-6 hydrogenated palm kernel oil, PEG-4 capric/caprylic triglyceride, mono, di, tri, tetraesters of vegetable oil and sorbitol, pentaerythrityl di, tetra stearate, isostearate, oleate, caprylate or caprate, polyglyceryl-3 dioleate, stearate, or isostearate, plygliceryl 4-10 pentacleate, polyglyceryl 2-4 oleate, stearate, or isostearate, polyglyceryl 4-10 pentaoleate, polyglycewryl-3 dioleate, polyglyceryl-6 dioleate, polyglyceryl-10 trioleate, polyglyceryl-3 distearate propylene glycol mono- or diesters of $C_6$ to $C_{20}$ fatty acid, monoglycerides of $C_6$ to $C_{20}$ fatty acid, lactic acid derivatives of monoglycerides, lactic acid dericatives of diglycerides, diacetyl tartaric ester of monoglycerides, triglycerol monostearate cholesterol, phytosterol, PEG 5-20 soya sterol, PEG-6 sorbitan tetra, hexasterarate, PEG-6 sorbitan tetraoleate, sorbitan monolaurate, sorbitan monopalmitate, sorbitan mono trioleate, sorbitan mono and tristearate, sorbitan monoisostearate, sorbitan sesquioleate, sorbitan sesquistearate, PEG-2-5 oleyl ether, POE 2-4 lauryl ether, PEG-2 cetyl ether, PEG-2 stearyl ether, sucrose distearate, sucrose dipalmitate, ethyl oleate, isopropyl myristate, isopropyl palmitate, ethyl linoleate, isopropyl linoleate, poloxamers, phospholipids, lecithins, cephalins, oat lipids and lipophilic amphiphilic lipids from other plants; and mixtures thereof.

The lipidic phase according to the invention is normally in liquid or paste form. According to another embodiment of the invention, the lipidic phase is dried and is available in powder form. The powder can be easily reconstituted when added into an aqueous or pure water phase. According to another embodiment of the invention, the lipidic phase can contain other ingredients, such as spices, herbs, or aromas.

The lipidic phase according to the invention is either a final product or an additive or intermediate product. The amount of the additive in the final product is not critical and can be varied.

The oil-in-water emulsion obtained from the low energy mixing of the lipidic phase of the invention with an aqueous phase according to the invention is either a final product or an additive. The amount of the additive in the final product is not critical and can be varied.

The emulsion described in this invention is a novel type of emulsion which we name 'ISAMULSION' to describe the specific nature of the oil droplets containing a structure being Internally Self-Assembled, and to exclude the emulsion of this invention from ordinary oil-in-water or w/o/w double emulsions, including nano- and microemulsions, in which the oil droplets do not have a nano-sized self-assembled structure with hydrophilic domains. The ISAMULSION droplets basically consist of oil droplets which have a nano-sized self-assembled structure with hydrophilic domains. This nanostructure is of a reversed nature comprising the L2, the microemulsion, the isotropic liquid phase, the micellar cubic, the hexagonal H2, or the bicontinous L3 or phase. The structures in the oil phase can appear as a single nano-structure or as a mixture of different nano-structures.

It is, therefore, an object of this invention to provide a lipidic phase or a mix containing this lipidic phase which allows to easily prepare an oil-in-water emulsion formulation just by adding low energy to the water-oil mixture. The lipidic phase can be used as such or can be part of a ready-to-use product, which can be used to freshly prepare the emulsion product during cooking or food preparation in the kitchen, restaurants, cantines, during camping or at other comparable occasions where no high shearing device is at one's disposal. The ready-to-use product can be used to freshly prepare a BBQ sauce or other sauces, marinade, mayonnaise, ketchup, salad dressings, seasonings, spices, and similar type of products.

Another field of application of the lipidic phase or the ready-to-use product containing the lipidic phase of the invention is for the fortificaton of home-made products with lipidic (non-easy-dispersible) functional molecules, such as nutrients, aromas, taste enhancers etc.

Another field of application is in Industrial or semi-Industrial production where one is interested to add a water-insoluble phase (lipidic phase) at a certain point without the use of homogenisers.

The above described behaviour of the lipidic phase and its adjacent oil-in-water emulsion can be easily used to design also new ready-to-use oil containing products for Food, Pet Food, Neutraceuticals, Functional Food, Detergents, Nutricosmeticals, Cosmetics, Pharmaceuticals, Drug Delivery, Paints, Medical or Agro-chemical Industry, Explosives, Textiles, Mining, Oil well drilling, Paper industry, Polymer Industry.

Figure 1:
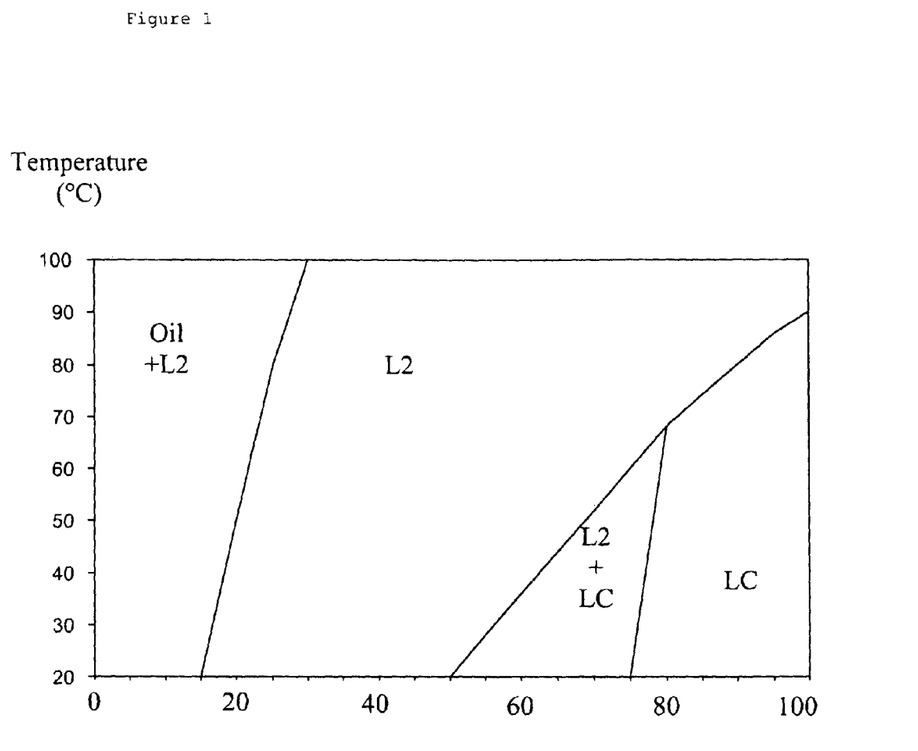
FIG. 1 shows the structure found in the interior of the ISAMULSION oil droplets as a function of $\alpha=100*LPA/(LPA+oil)$.
Figure 6:
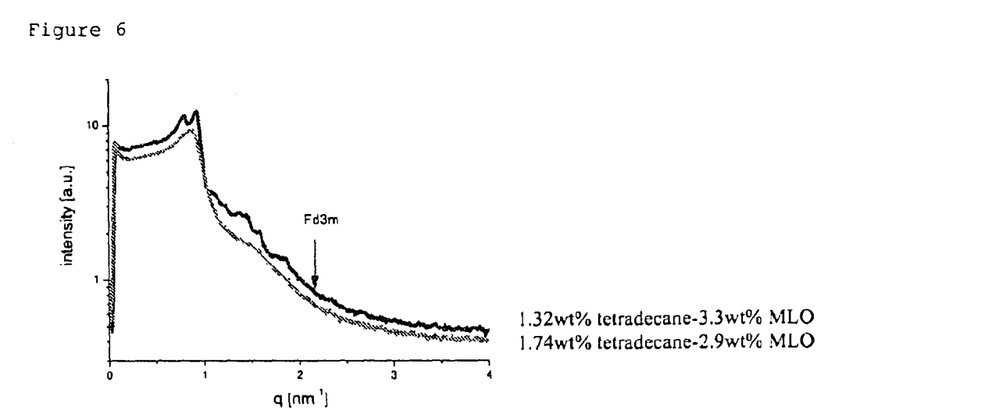
FIG. 6 (upper curve) shows the small angle X-ray scattering (SAXS) curve of an ISAMULSION containing oil droplets that have a reversed micellar cubic Fd3m structure.
Figure 9:
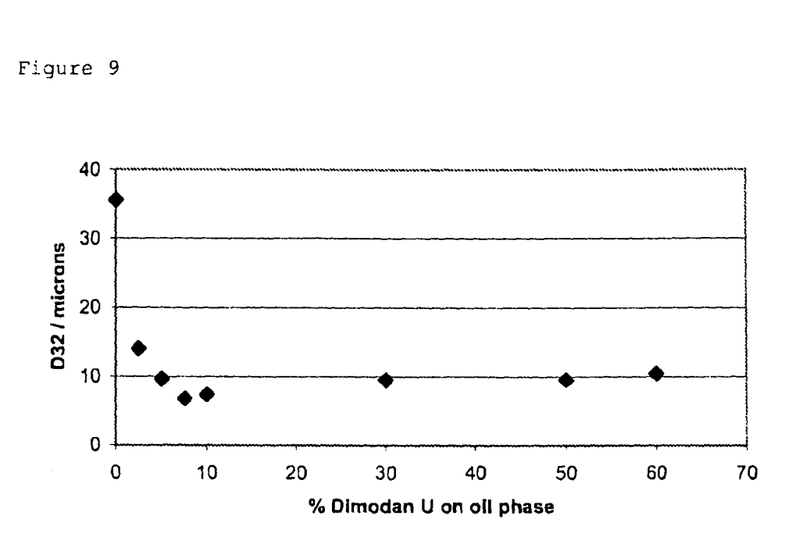

FIG. 9 shows the oil droplet size D32 (Sauter droplet diameter, given in microns) of ISAMULSIONS as a function of the DIMODAN U/J content in the oil phase, given as wt-% of Dimodan U/J in soybean oil. The ISAMULSION oil phase (soybean+DIMODAN U/J) is constant 40 vol % in all emulsions. Emulsions are stabilized by 5 wt-% Na-Caseinate (on aqueous phase); Emulsions are prepared by using a low energy stirrer. Malvern Mastersizer data FIG. 1 represents the typical sequence of structures found in the interior of the dispersed oil droplets of the ISAMULSION as a function of the content of the lipophilic additive in % (% $LPA=\alpha=100*LPA/(LPA+OIL)$) and temperature. Changing $\alpha$, i.e., the LPA content in the oil droplets, allows to change and modulate the nano-structure inside the droplets. L2 denotes a reversed microemulsion-like structure; LC denotes the existence of a liquid crystalline phase or a mixture of different liquid crystalline phases, such as the reversed micellar or reversed hexagonal, or reversed bicontinuous cubic. As FIG. 1 shows, a defined nano-sized self-assembled structure is formed at a given temperature and a specific amount of added lipophilic additive ($\alpha$ value) inside the oil droplets (for a closer description of the mentioned structures, see Evans, D. F.; Wennerström, H. (Eds.); 'The Colloidal Domain', Wiley-VCH, New York, (1999)). The amount of added LPA allows to precisely control the type of self-assembly structure, amount of water present in the hydrophilic domains, the amount of internal interface and the size, dimension, of the self-assembly nano-structure formed inside the ISAMULSION droplets. Depending on the used oil-type and type of lipophilic additive, the minimum amount of LPA ($\alpha$) needed to initiate the spontaneous formation of the self-assembled internal droplet structure (also denoted as critical micellar concentration CMC or critical aggregate concentration) is between 0.1 and 15 wt-% (on the oil phase). Moreover, the $\alpha$ value at which a phase change in the oil droplets is observed depends also on the used type of oil and/or lipophilic additive.

The internal nano-sized self-assembled structure of the oil droplets in the emulsion can be detected by means of Cryo-Transmission Electron Microscopy or SAXS.

Figure 2:
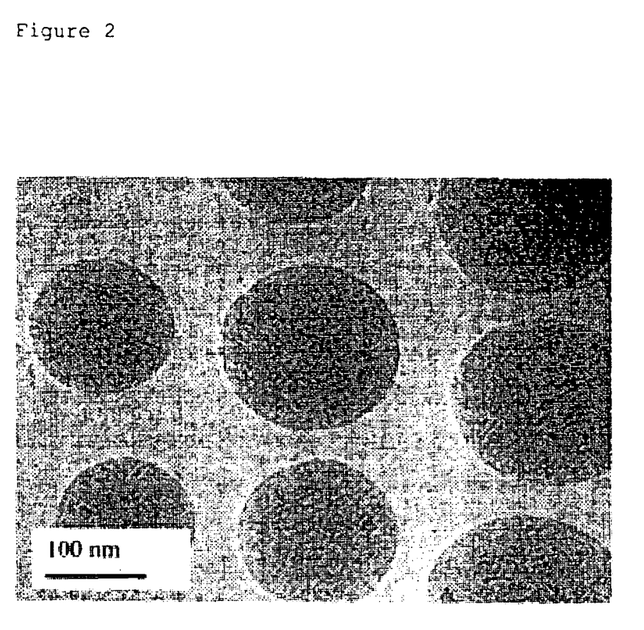
FIG. 2 shows a Cryo-TEM micrograph of a typical ISAMULSION, showing the nano-sized hydrophilic domains inside single oil droplets.

The cryo TEM image of FIG. 2 was obtained using the standard technique of Adrian et al (Adrian et al. Nature, (1984) 308, 32-36). A home made guillotine was used for sample freezing. A droplet of 3 µl sample dispersion was deposited onto a copper grid covered with a holy carbon film containing holes of about 2 µm in diameter. A filter paper was pressed on the liquid side of the grid (blotting) for removing excess sample solution. Immediately after liquid removal, the grid, held by tweezers, was propelled into liquid ethane. Frozen grids were stored in liquid nitrogen and transferred into a cryo-holder kept at −180° C. Sample analysis was performed in a Philips CM12 TEM at a voltage of 80 kV. Low dose procedures were applied to minimise beam damage. In some cases a home build environmental chamber similar to the one described by Egelhaaf et al (Egelhaaf et al, *J. Microsc.* (2000) 200, 128-139) was used. The temperature before thinning and vitrifying was set at 25° C. and 100% humidity was used. The ISAMULSION can be identified by the presence of small bright features inside the oil droplets. FIG. 2 is a Cryo-TEM micrograph of a typical ISAMULSION showing characteristic distances between the bright features of about 7-8 nm. It should be noted that such bright features are not observed for standard non-structured emulsions and there is no contrast inside non-structured emulsion droplets.

Figure 3:
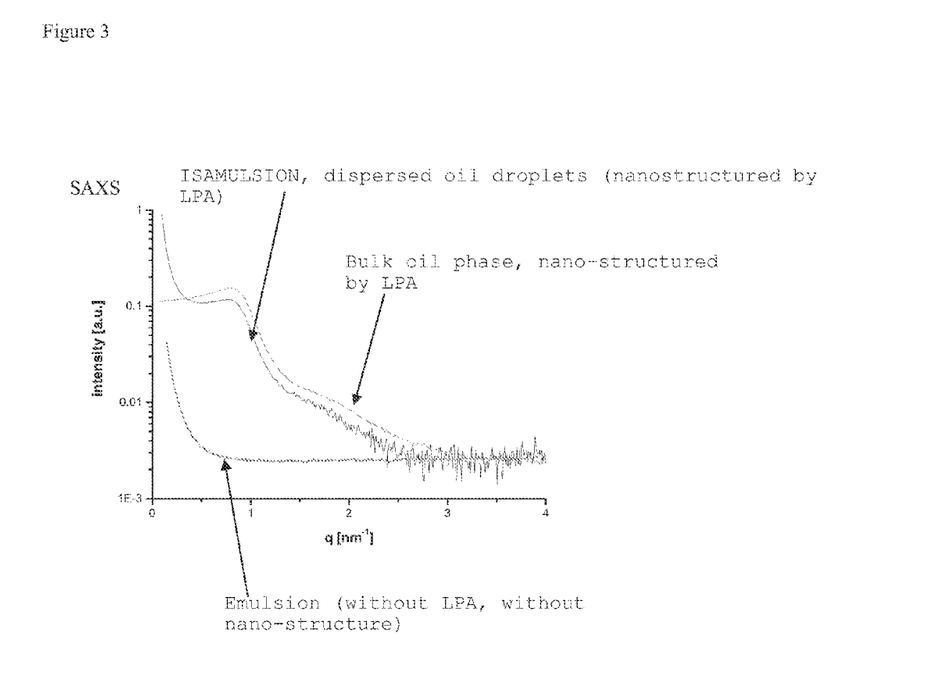
FIG. 3 shows the small angle X-ray scattering (SAXS) pattern of an ISAMULSION, of the bulk oil phase (nano-structured by LPA), which was used for making the ISAMULSION and of the corresponding ordinary emulsion (without LPA, without nano-structure). The scattering curve of an ordinary emulsion is clearly different from the curve of the ISAMULSION.

The SAXS curves of FIG. 3 were obtained by a standard equipment (Bergmann et al. *J. Appl. Cryst.* (2000) 33, 869-875), using a X-ray generator (Philips, PW 1730/10) operating at 40 kV and 50 mA with a sealed-tube Cu anode. A Göbel mirror is used to convert the divergent polychromatic X-ray beam into a focused line-shaped beam of Cu K$_\alpha$ radiation ($\lambda$=0.154 nm). The 2D scattering pattern is recorded by an imaging-plate detector and integrated to the one-dimensional scattering function I(q) using SAXSQuant software (Anton Paar, Graz, Austria), where q is the length of the scattering vector, defined by q=(4$\pi$/$\lambda$)sin $\theta$/2, $\lambda$ being the wavelength and $\theta$ the scattering angle. The broad peaks of scattering profiles were desmeared by fitting these data with the Generalized Indirect Fourier Transformation method (Bergmann et al. (2000), 33, 1212-1216). The characteristic distances are given by d=2$\pi$/q. FIG. 3 shows the small angle X-ray scattering patterns of an ISAMULSION (same as investigated in FIG. 2) together with the corresponding non-dispersed bulk oil phase (nano-structured by LPA) that it is made from, and the corresponding ordinary emulsion (without LPA, without nano-structure). It can be seen that the ISAMULSION shows the same peak position as the non-dispersed bulk oil phase that it is made from. The characteristic distance for both is about 7.5 nm. This characteristic distance is higher than the diameter of the hydrophilic domain. Therefore the hydrophilic domains have a size smaller than 7 nm. For the man skilled in the art, this small size of the hydrophilic domains demonstrates that the internal structure of the oil droplet is thermodynamically stable. Moreover, for the corresponding ordinary emulsion, in which no LPA is added (no nano-structure), no peak is observed. This is an additional prove of the presence of a nano-sized self-assembled structure inside the oil droplets of an ISAMULSION. It does not change upon dispersion in water, indicating that the internal ISAMULSION droplet structure is in a thermodynamic equilibrium state.

Figure 5:
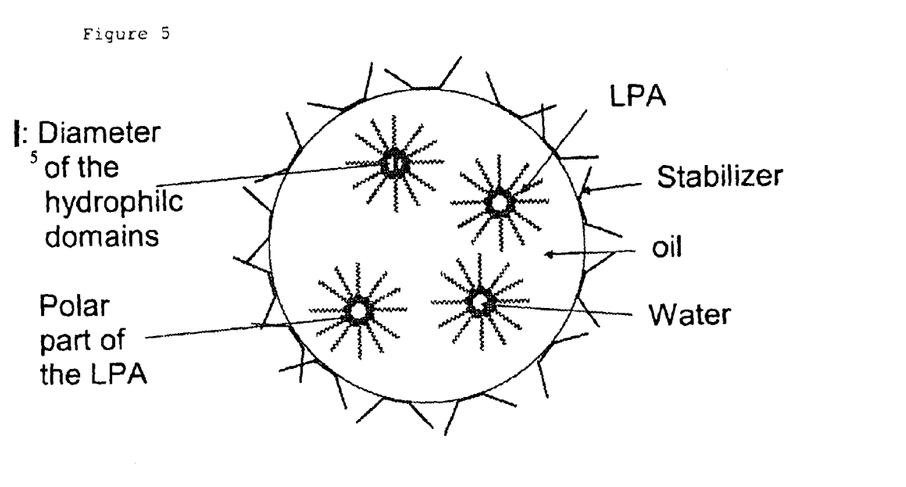
FIG. 5 shows a schematic of an Isamulsion oil droplet, which contains hydrophilic domains. Note that the hydrophilic domains can be spherical or non-spherical, i.e. rods, disks or channels. The hydrophilic domain consists of the polar head group of the LPA and the solubilized water.

FIG. 5 shows a schematic of an oil droplet which has been nano-structured by addition of a LPA. The structural definition of a hydrophilic domain is specified. Hydrophilic domains include the polar part (head group) of the LPA (and not the hydrocarbon tail region and the water part). The minimum diameter of a hydrophilic domain can be about 0.5 nm which is more or less the cross section of 2 head groups containing no water molecules. The minimum size of the polar part of a lipophilic addive or emulsifier is about 0.2 nm. The diameter of a water molecule is about 0.3 nm.

Figure 7:
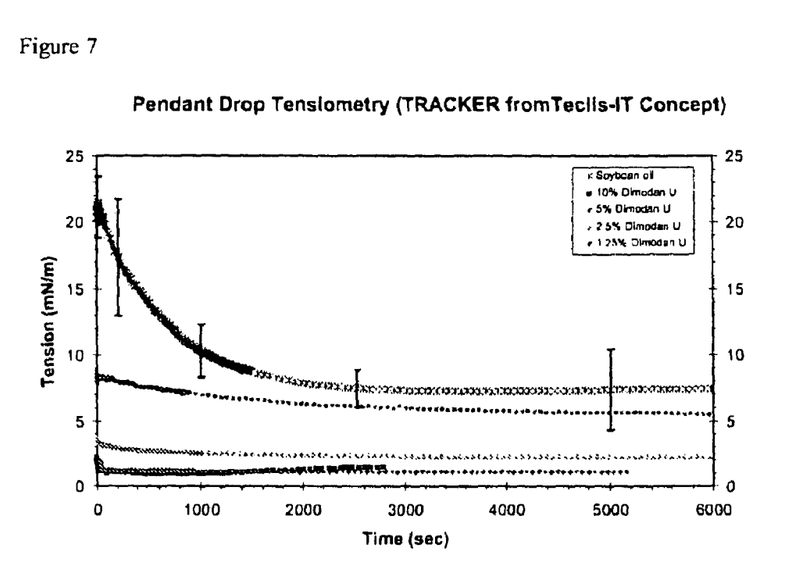
FIG. 7 shows the interfacial tension measured between the lipidic phase of the invention (in this case soybean oil+Dimodan U/J as LPA) against pure water as a function of the DIMODAN U/J content, using the Pendant prop technique.

FIGS. 6 and 7 are showing oil-water tension measurements as a function of the LPA (DIMODAN U) content in the oil (soybean oil).

Figure 8:
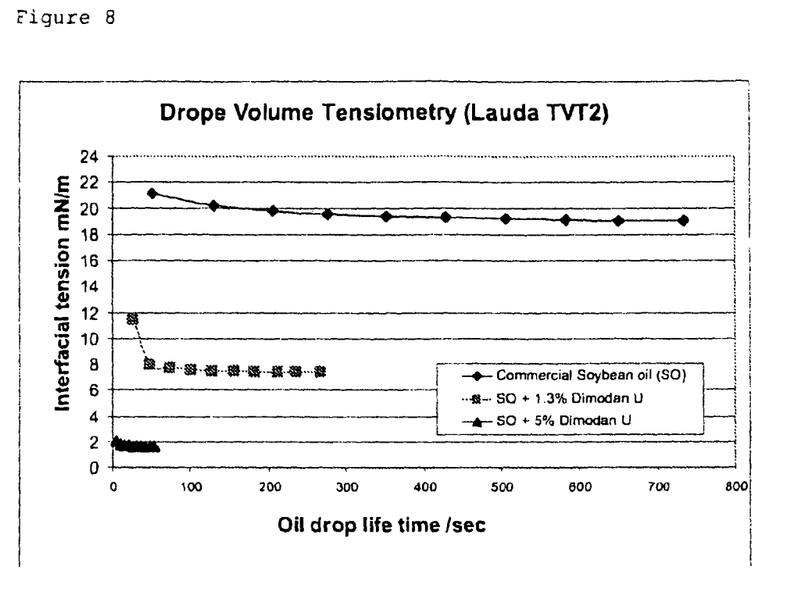
FIG. 8 shows the interfacial tension measured between the lipidic phase of the invention (in this case soybean oil+Dimodan U/J as LPA) against pure water as a function of the DIMODAN U/J content, using the prop volume tensiometer.

FIG. 8 shows the Sauter diameter D32 of emulsions made with low energy intake as a function of the DIMODAN U content in the soybean oil phase.

EXAMPLES

The various embodiments of this invention provide an oil-in-water emulsion in which the dispersed oil droplets exhibit a nano-sized, self-assembled structure of hydrophilic domains due to the presence of a lipophilic additive (LPA). The presence of the LPA in the oil phase allows to prepare oil-in-water emulsions using only low energy intake mixing. The following examples are illustrative in nature and are not to be construed as limiting the invention, the scope of which is defined by the appended claims.

Example 1

Figure 4:
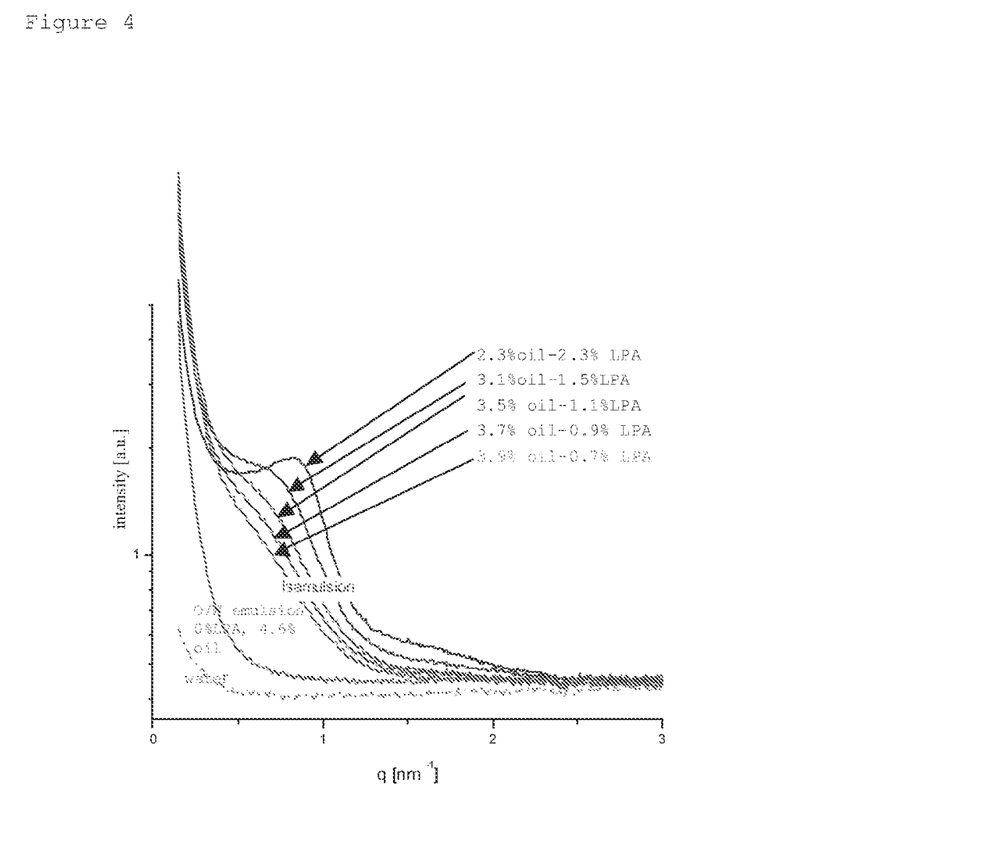
FIG. 4 shows the small angle X-ray scattering (SAXS) pattern of ISAMULSIONS containing various amounts of LPA, i.e., $\alpha$ values ($\alpha=100*LPA/(LPA+OIL)$). Oil=Tetradecane, LPA-Monolinolein. The content of the LPA determines the concentration and size of the self-assembled hydrophilic domains inside the oil droplets.

Generic Examples of an ISAMULSION—Showing How to Detect the Specific ISAMULSION Droplet Structure in a Reference Model System Typically 1-5 wt % of a mineral oil, such as tetradecane, was added to 95 wt % water containing already 0.375 wt % of the emulsifier (Tween 80 or Pluronic F127). 0.5-4 wt % LPA (glycerol monolinoleate) was then added to the mixture. The total amount of lipophilic molecules (mineral oil+LPA) was 4.625 wt % ($\alpha$ is between 9 and 80). Ultrasonication was then carried out for 20 minutes. The ISAMULSION character of the emulsions was confirmed by cryo-TEM images and SAXS curves such as the ones of FIG. 2 and FIG. 3-4. FIG. 2, FIG. 3, were obtained from those generic examples with a composition of 2.4 wt % mineral oil (tetradecan)—2.2 wt % LPA ($\alpha$=48)—0.375 wt % primary emulsifier (pluronic F127)—95 wt % water. In addition, corresponding bulk samples (non dispersed samples containing the oil and the LPA but no emulsion stabilizer) were prepared and analysed. The weight ratio oil (tetradecan)/LPA (glycerol monolinoleate) was 1.1/1.0. The mixture oil-LPA-water was heated and mixed with a Vortex until the sample was homogeneous. After addition of 0, 5, or 10 wt % water to the oil/LPA mix, the sample was clear indicating that the water was totally solubilized into the oil/LPA mixture and a w/o microemulsion was formed. After addition of higher amounts of water, the sample shows phase separation. It was noted that the samples containing 15 and 20 wt % water show the same SAXS curves as the corresponding ISAMULSION sample (2.4 wt % mineral oil-2.2 wt % LPA-0.375 wt % emulsifier). This demonstrates that ISAMULSION droplets show the same characteristic distance of 7.5 nm as observed in the corresponding bulk phases (see FIGS. 2 and 3). FIG. 4 shows that ISAMULSIONS are formed (e.g. a peak in the SAXS curve is observed) already with relatively low LPA and high oil contents (e.g. 3.9 wt % mineral oil (tetradecan)-0.725 wt % LPA (glycerol monolinoleate, $\alpha$=16), 0.375 wt % emulsifier (pluronic F127)-95% water). However an ISAMULSION is not formed when no LPA is present as shown in FIG. 3 (composition 4.625 wt % oil (tetradecan), 0.375 wt % pluronic F127, 95 wt % water). Also with higher amounts of LPA ($\alpha$ values) (Example of a composition: 1.32 wt % tetradecan-3.3 wt % LPA ($\alpha$=71)—0.375 wt % Pluronic F127) an ISAMULSION is formed. The structure is more ordered than observed with a lower $\alpha$ value (LPA content) and shows a reversed micellar cubic arrangement of the hydrophilic domains, as shown by the SAXS curves (FIG. 6; upper curve).

Example 2

ISAMULSION Obtained by the Hydrotrope Route and Vortexing 1 wt % emulsifier (Pluronic F127) was dissolved in 89 wt % water forming the aqueous solution. 2.5 wt % mineral oil (tetradecan) and 2.5 wt % LPA (glycerol monolinoleate, $\alpha$=50) were dissolved in 5 wt % ethanol forming the lipidic solution. The aqueous solution was slowly added to the lipidic solution while vortexing. At the end of the process, the ISAMULSION, i.e., droplets having an interior nano-sized self-assembled structure has formed.

Example 3

ISAMULSIONS Obtained by Hand-Shaking of the Lipidic and Aqueous Phase 0.5-4.5 wt % of soybean oil (on the total emulsion product) was mixed first with 0.5-2.0 wt % LPA (Dimodan U/J, Danisco, Dannmark; on the total emulsion product, 10$\leq\alpha\leq$80) to prepare the lipidic phase. This mixture was added to 95% water containing 0.375% of the emulsifier (Pluronic F127). The total amount of lipidic phase (oil+LPA;

given on the total emulsion product) was 4.625 wt %. The mixture was hand shaken. A homogeneous milky and relatively stable emulsion was formed. The ISAMULSION character of the emulsions was confirmed by cryo-TEM images and SAXS.

Example 4

ISAMULSIONS Obtained by Stirring the Lipidic Phase and Skimmed Milk with a Propeller Stirrer 1.2 wt % of soybean oil (on the total emulsion product) was mixed first with 1.8 wt % LPA (Dimodan U/J, Danisco, Dannmark; on the total emulsion product, $\alpha$=60) to prepare the lipidic phase. 3 wt % of this lipidic phase was added to 97% skimmed milk. The mixture was stirred with a propeller stirrer. A homogeneous milky and stable emulsion was formed. 50% of the emulsified oil droplets where smaller than 44 µm, as measured with the Malvern Mastersizer. The measured D32 was 10 µm. The milk and the oil droplets in the milk were still stable after one week storage at refrigerated temperatures. However, when compared with the respective milk products made out of soybean oil only (no LPA added to the oil phase) using the same preparation method, the oil droplets were significantly larger than the droplets in the emulsion of this invention (oil droplets contain a LPA) and the milk was significantly creamed after one week of storage at refrigerated temperatures. Only 50% of the oil droplets in the milk after preparation were smaller than 150 µm (D32 was 35 µm). This means that they are more than times larger than the oil droplets in the emulsion of this invention in which the oil contained 60% (on the lipidic phase) of LPA.

Example 5

ISAMULSIONS Obtained by Stirring the Lipidic Phase and an Aqueous Na Caseinate Phase with a Propeller Stirrer 39 wt % of soybean oil (on the total emulsion product) was mixed first with 1.0 wt % LPA (Dimodan U/J, Danisco, Dannmark; on the total emulsion product, $\alpha$=2.5) to prepare the lipidic phase. 40 wt % of this lipidic phase was added to 60% of a 5 wt % Na Caseinate solution. The mixture was stirred with a propeller stirrer. A homogeneous milky and stable oil-in-water emulsion was formed. 50% of the emulsified oil droplets were smaller than 73 µm, as measured with the Malvern Mastersizer. The measured D32 was 13 µm (see FIG. 9). The emulsion and the oil droplets in the emulsion were still stable after one week storage at refrigerated temperatures. However, when compared with the respective emulsion made out of soybean oil only (no LPA added to the oil phase) using the same preparation method, the oil droplets were significantly larger than the droplets in the emulsion of this invention (oil droplets contain the LPA, see FIG. 9) and the emulsion was significantly creamed and some free oil was detected at the surface of the solution after one week of storage at refrigerated temperatures. Concerning the oil droplet size in this emulsion, 50% of the oil droplets were smaller than 150 µm after preparation and the D32 was 35 µm (see FIG. 9) i.e., still significantly larger than the respective emulsion of this invention, in which the oil contained 2.5 wt % of LPA (calculated on the oil phase).

The smaller mean droplet sizes generated with the ISAMULSION formulation is connected with the lower interfacial tension $\gamma$ exerted between the lipidic phase (soybean oil plus DIMODAN U/J) and pure water ($\gamma \leq 5$ mN/m) compared to the interfacial tension measured between the oil (no added DIMODAN U/J) and pure water ($\gamma > 5$ mN/m) (see FIGS. 7 and 8).

The ISAMULSIONS prepared according to the above mentioned examples can be used as such or as an additive.

Having now fully described the invention, it will be understood by those of ordinary skill in the art that the same can be performed within a wide and equivalent range of mixing conditions and formulations without affecting the scope of the invention or any embodiment thereof.

The invention claimed is:

1. A process for preparing an oil-in-water emulsion, the process comprising mixing a lipidic phase with an aqueous phase by manual operation or using a low energy device, wherein the lipidic phase comprises:
   (i) an oil selected from the group consisting of mineral oils, hydrocarbons, vegetable oils, waxes, alcohols, fatty acids, mono-, di-, tri-acylglycerols, essential oils, flavouring oils, lipophilic vitamins, esters, neutraceuticals, terpins, terpenes, and mixtures thereof, and
   (ii) a lipophilic additive (LPA) or mixtures of lipophilic and hydrophilic additives, having a resulting HLB value (Hydrophilic-Lipophilic Balance) lower than about 10, wherein the LPA content in the lipidic phase is between 0.25 wt-% and 84 wt-%,
   wherein the aqueous phase contains an emulsifier or an emulsion stabilizer, and wherein the emsulsion forms oil droplets having a diameter in the range of 5 nm to hundreds of micrometers which droplets exhibit nano-sized self-assembled structures with hydrophilic domains having a diameter in the range of 0.5 to 200 nm due to the presence of the LPA in the lipidic phase.

2. The process according to claim 1, wherein the LPA content in the lipidic phase is between 2.5 wt-% and 80 wt.

3. The process according to claim 1, wherein the LPA content in the lipidic phase is between 5 wt-% and 80 wt %.

4. The process according to claim 1, wherein the LPA content in the lipidic phase is between 10 wt-% and 80 wt %.

5. The process according to claim 1, wherein the oil droplets contain oil soluble, oil non-soluble or water soluble material selected from the group consisting of flavours, flavour precursors, drugs, nutraceuticals, selected from the group comprising of lutein, lutein esters, β-carotene, tocopherol, tocopherol acetate, tocotrienol, lycopene, Co-$Q_{10}$, flax seed oil, lipoic acid, vitamin $B_{12}$, vitamin D, α- and γ-polyunsaturated fatty acids or phytosterols, food supplements, food additives, plant extracts, medicaments, cosmeceuticals, peptides, proteins or carbohydrates, nutrients, aromas, and aroma precursors.

6. The process according to claim 1, wherein the LPA is selected from the group of long-chain alcohols, fatty acids, pegylated fatty acids, glycerol fatty acid esters, monoglycerides, diglycerides, derivatives of mono-diglycerides, pegylated vegetable oils, sorbitan esters, polyoxyethylene sorbitan esters, propylene glycol mono- or diesters, phospholipids, phosphatides, cerebrosides, gangliosides, cephalins, lipids, glycolipids, sulfatides, sugar esters, sugar ethers, sucrose esters, sterols, and polyglycerol esters.

7. The process according to claim 6, wherein the LPA is selected from the group consisting of myristic acid, oleic acid, lauric acid, stearic acid, palmitic acid, PEG 1-4 stearate, PEG 2-4 oleate, PEG-4 dilaurate, PEG-4 dioleate, PEG-4 distearate, PEG-6 dioleate, PEG-6 distearate, PEG-8-dioleate, PEG-3-16 castor oil, PEG 5-10 hydrogenated castor oil, PEG 6-20 corn oil, PEG 6-20 almond oil, PEG-6 olive oil, PEG-6 peanut oil, PEG-6 palm kernel oil, PEG-6 hydrogenated palm kernel oil, PEG-4 capric/caprylic triglyceride, mono, di, tri, tetraesters of vegetable oil and sorbitol, pentaerythrityl di, tri, or tetra stearate, isostearate, oleate, caprylate or caprate, polyglyceryl-3 dioleate, stearate, or isostearate, polyglyceryl 4-10 pentaoleate, polyglyceryl 2-4 oleate, stearate, or isostearate, polyglyceryl 4-10 pentaoleate, polyglyceryl-3 dioleate, polyglyceryl-6 dioleate, polyglyceryl-10 trioleate, polyglyceryl-3 distearate, propylene glycol mono- or diesters of $C_6$ to $C_{20}$ fatty acids, monoglycerides of $C_6$ to $C_{20}$ fatty acids, lactic acid derivatives of monoglycerides, lactic acid derivatives of diglycerides, diacetyl tartaric ester of monoglycerides, triglycerol monostearate, cholesterol, phytosterol, PEG 5-20 soya sterol, PEG-6 sorbitan tetra or hexastearate, PEG-6 sorbitan tetraoleate, sorbitan monolaurate, sorbitan monopalmitate, sorbitan mono or trioleate, sorbitan mono or tristearate, sorbitan monoisostearate, sorbitan sesquioleate, sorbitan sesquistearate, PEG-2-5 oleyl ether, POE 2-4 lauryl ether, PEG-2 cetyl ether, PEG-2 stearyl ether, sucrose distearate, sucrose dipalmitate, ethyl oleate, isopropyl myristate, isopropyl palmitate, ethyl linoleate, isopropyl linoleate, poloxamers, phospholipids, lecithins, cephalins, oat lipids and lipophilic or amphiphilic lipids from other plants, and mixtures thereof.

8. The process according to claim 1, wherein the emulsifier is selected from the group consisting of low molecular weight surfactants having a HLB>8, proteins from milk or soya, peptides, protein hydrolysates, block co-polymers, surface active hydrocolloids such as arabic gum, xanthan gum, surfactant-protein nanoparticles, surfactant stabilized nano- or micro silica particles, and mixtures thereof.

9. The process according to claim 1, further comprising preparing a powder from the emulsion, which powder is easily reconstituted into an aqueous phase at room or cold temperatures.

10. The process according to claim 1, wherein the emulsion is a final product.

11. The process according to claim 1, wherein the emulsion is a starting material, an intermediate product or an additive to a final product.

12. The process according to claim 1, wherein the manual operation or low energy device is selected from the group consisting of manual squeezing, magnetic stirring, hand shaking, spoon or whisk stirring, vortex mixing, membrane emulsification, static mixer, kitchen mixer, nano- and microfluidics devices, pouch mixing, any mixer which creates a turbulent flow, or combinations thereof.

* * * * *